(12) United States Patent
Man et al.

(10) Patent No.: US 6,933,621 B2
(45) Date of Patent: Aug. 23, 2005

(54) ELECTRICAL POWER-GENERATING DEVICE

(75) Inventors: Choi Yau Man, Hong Kong (HK); Yichia Chen, Tainan (TW)

(73) Assignee: KJC International Company Limited, Hong Kong (HK)

( * ) Notice: Subject to any disclaimer, the term of this patent is extended or adjusted under 35 U.S.C. 154(b) by 106 days.

(21) Appl. No.: 10/681,197

(22) Filed: Oct. 9, 2003

(65) Prior Publication Data

US 2005/0035599 A1 Feb. 17, 2005

(30) Foreign Application Priority Data

Aug. 14, 2003 (TW) .......................................... 92214737

(51) Int. Cl.[7] ............................................... H02P 9/04
(52) U.S. Cl. ............................ 290/1 R; 290/1 C; 322/1
(58) Field of Search ................................. 290/1 R, 1 A, 290/1 C; 322/1, 2 R

(56) References Cited

U.S. PATENT DOCUMENTS

| 3,573,479 | A | * | 4/1971 | Rieth | .......................... | 290/1 E |
| 4,093,882 | A | * | 6/1978 | Furuta | .......................... | 310/268 |
| 4,260,901 | A | * | 4/1981 | Woodbridge | .................. | 290/42 |
| 4,360,860 | A | * | 11/1982 | Johnson et al. | .............. | 362/192 |
| 5,998,975 | A | * | 12/1999 | Tada et al. | ...................... | 322/7 |

* cited by examiner

Primary Examiner—Nicholas Ponomarenko
(74) Attorney, Agent, or Firm—Troxell Law Office, PLLC

(57) ABSTRACT

An electrical power-generating device comprising an outer shell, at least one power generation unit, a centerboard, a transmission axis, a gear set and a starting device. The major characteristic is: at least one power generation unit and at least one centerboard are installed vertically to the transmission axis. The centerboards with many permanent magnetic bodies are inside the power generation unit, many coil sets are installed on both sides of the power generation unit, the number of the permanent magnetic bodies is equal or twice the number of the coil sets; users can roll the starting device and turn the transmission axis, the movement generates electrical power when the permanent magnet bodies pass through the coil sets on both sides.

11 Claims, 5 Drawing Sheets

ELECTRICAL POWER-GENERATING DEVICE

BACKGROUND OF THE INVENTION

1. Field of the Invention

This invention relates generally to an electrical power-generating device, more specifically, to an electrical power-generating device that generates electrical power with a starting device to turn a gear set and power generation units. A plurality of coil sets can be connected in parallel or in series depends on different applications, the quantity of the coil sets can be varied as required; the coil sets are installed on both sides of power generation unit.

2. Description of the Prior Art

Heretofore, it is known that the small type electrical power generators generate electrical power by rolling the handle to turn a gear set along with the power generation unit. For example, Taiwan Utility Model Filing No. 87200947, "permanent magnetic manpower electrical power generator", comprises a fixing portion, a turning portion, rolling handle, increasing speed gear set and a outer shell; the fixing portion, the turning portion and the increasing speed gear set are installed inside the outer shell. The input of the increasing speed gear set, the output gear set axis are connected to the rolling handle and the turning portion, the characteristic is: the fixing portion contains at least one set of the single-phase or the three-phase evenly distributed petal shape magnetic poles, every magnetic pole contains a coil set. The turning portion contains many multiple-pole magnetic bodies made of boron ferrite compound; the center of the turning portion is an open hole, the multiple-pole magnetic bodies surround the circle with N, S poles in interval, the round multiple-pole magnetic bodies roll around the fixing portion. However, the output voltage of above example is fixed, users cannot modify the structure of the power generation unit to change the output voltage.

SUMMARY OF THE INVENTION

It is therefore a primary object of the invention to provide an electrical power-generating device that generates electrical power by rolling the starting device to turn the gear set and along with the power generation unit; the output of the plurality coil sets of the power generation unit can be connected in parallel or in series by different applications, the number of the coil set can also be modified as required; the plurality coil sets are installed on both sides of the power generation unit.

In order to achieve the objective set forth, a an electrical power-generating device in accordance with the present invention comprises an outer shell, at least one power generation unit, a centerboard, a transmission axis, a gear set and a starting device. The major characteristic is: at least one power generation unit and at least one centerboard are installed vertically to the transmission axis. The centerboards with many permanent magnetic bodies are inside the power generation unit, many coil sets are installed on both sides of the power generation unit, the number of the permanent magnetic bodies is equal or twice the number of the coil sets; users can roll the starting device and turn the transmission axis, the movement generates electrical power when the permanent magnet bodies pass through the coil sets on both sides.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
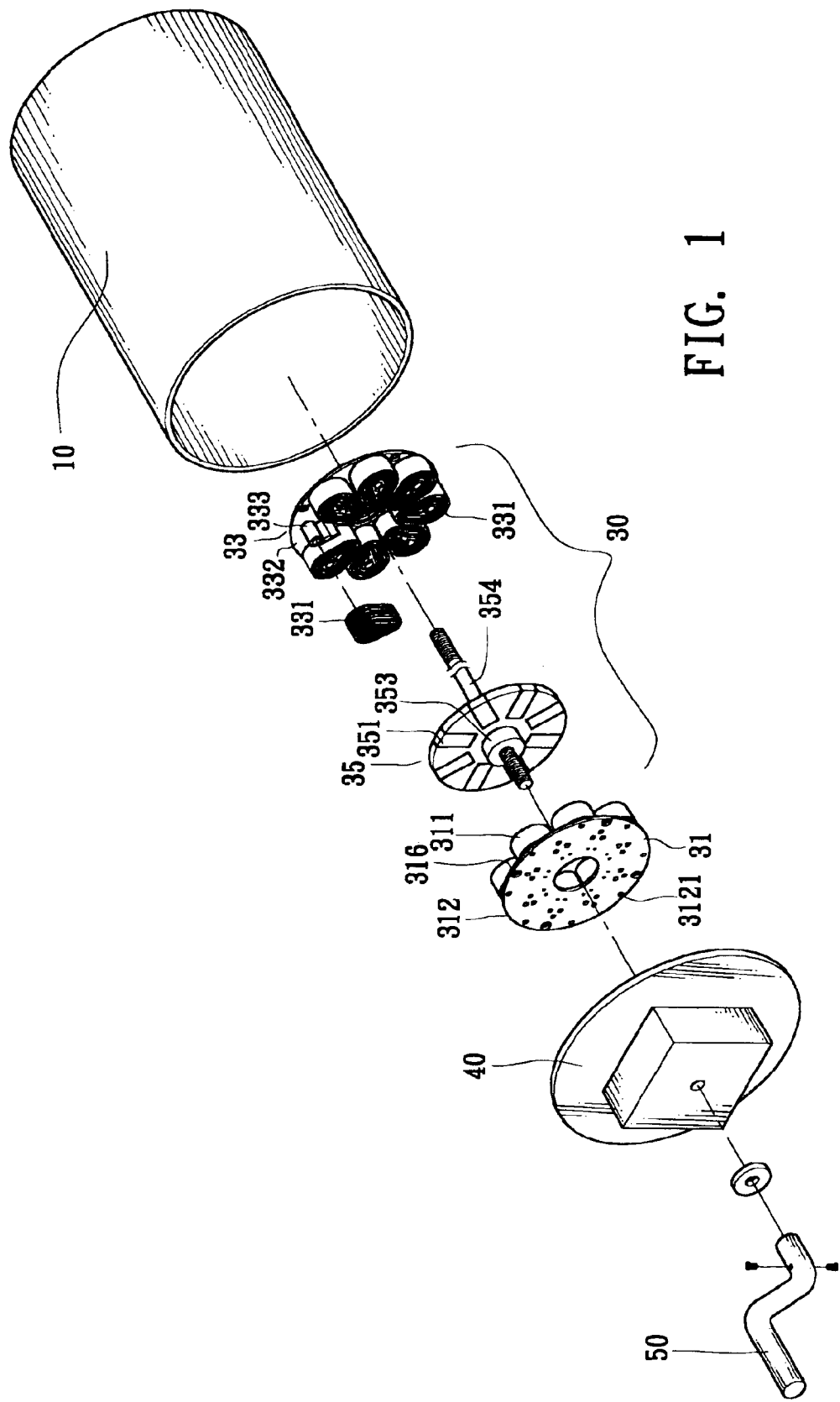
FIG. 1 is an assembly view of the present invention.

Referring to FIG. 1, there is shown the assembly view of the present invention. As shown in FIG. 1, the electrical power generator 1 comprises of an outer shell 10, at least one power generation unit 30, a gear set 40 and a starting device 50.

The power generation unit 30 is installed and fixed inside the outer shell 10; the gear set 40 locates adjacent to the power generation unit 30; the starting device 50 is connected to the gear set 40 to turn the gear set 40 and further turn the power generation unit 30. The starting device 50 can be brought up by wind, water or manpower to turn the gear set 40 and the power generation unit 30 for electrical power.

Each of the power generation unit 30 further comprises a first power generation portion 31, a second power generation portion 33 and a centerboard 35. The first power generation portion 31 consists of a plurality first coil set 311 and a first PCB 312, the first PCB 312 has a plurality through hole 3121, three through hole 3121 are grouped into a set in triangle shape, every first coil set 311 consists of an input 314, a output 315 (not shown in FIG.) and is wrapped in a first core 313; the input 314 and output 315 of the plurality first coil set 311 are connected in series or in parallel depends on the application, when users need power with low voltage and high current, the plurality input 314 and output 315 are connected in parallel, when users need power with high voltage and low current, the plurality input 314 and output 315 are connected in series; the number of the plurality second coil set 311 and the second core 313 better be even for better effect.

The second power generation portion 33 consists of a plurality second coil set 331 and a second PCB 332, the second PCB 332 has a plurality through hole 3321, three through hole 3321 are grouped into a set in triangle shape, every second coil set 331 consists of an input 334, a output 335 (not shown in FIG.) and is wrapped in a second core 333, the input 334 and output 355 of the plurality second coil set 331 are connected in series or in parallel depends on the application; the number of the plurality second coil set 311 and the second core 313 better be even for better effect.

The first core 313 and the second core 333 are made of non-conductive material and are in round or elliptical shape, they are fixed on the through hole 3121 and 3321 respectively. The outer side of the first PCB 312 and the second PCB 332 has at least one screw hole 316 and 336 respectively, screws or other fixing devices (not shown in FIG.) can pass through those screw hole 316 and 336 to fix the first PCB 312 and the second PCB 332 firmly on the first power generation portion 31 and the second power generation portion 33 respectively.

The centerboard 35 has a plurality permanent magnet 351 and is installed between the first power generation portion 31 and the second power generation portion 33 to rotate freely between the first power generation portion 31 and the second power generation portion 33; the quantity of the permanent magnet 351 equals to the quantity of the first coil set 311 and the second coil set 331, or the quantity of the permanent magnet 351 is twice of the quantity of the first coil set 311 and the second coil set 331; for better effect, the number of the permanent magnet 351 is in even pair and aligned in plus, minus poles with equal distance on the centerboard 35; the distance between the permanent magnet 351 is very small to reduce the resistance while changing poles to achieve the purpose of the power generation with minimum strength. The centerboard 35 further consists of a third round hole 352 (not shown in FIG.) located on the center of the centerboard 35; a sleeve tube 353 can pass through the third round hole 352, for better effect, the thickness on two ends of the sleeve tube 353 are different; a transmission axis 354 with teeth on at least one end that passes through the sleeve tube 353 to join with the gear set 40; such arrangement makes the gear set 40 and the centerboard 35 roll when the starting device 50 start moving, the movement generates electrical power when a plurality permanent magnet 351 pass through a plurality first coil set 311 and a plurality second coil set 331. The centerboard 35 and the sleeve tube 353 are made by plastic injection process.

Figure 2:
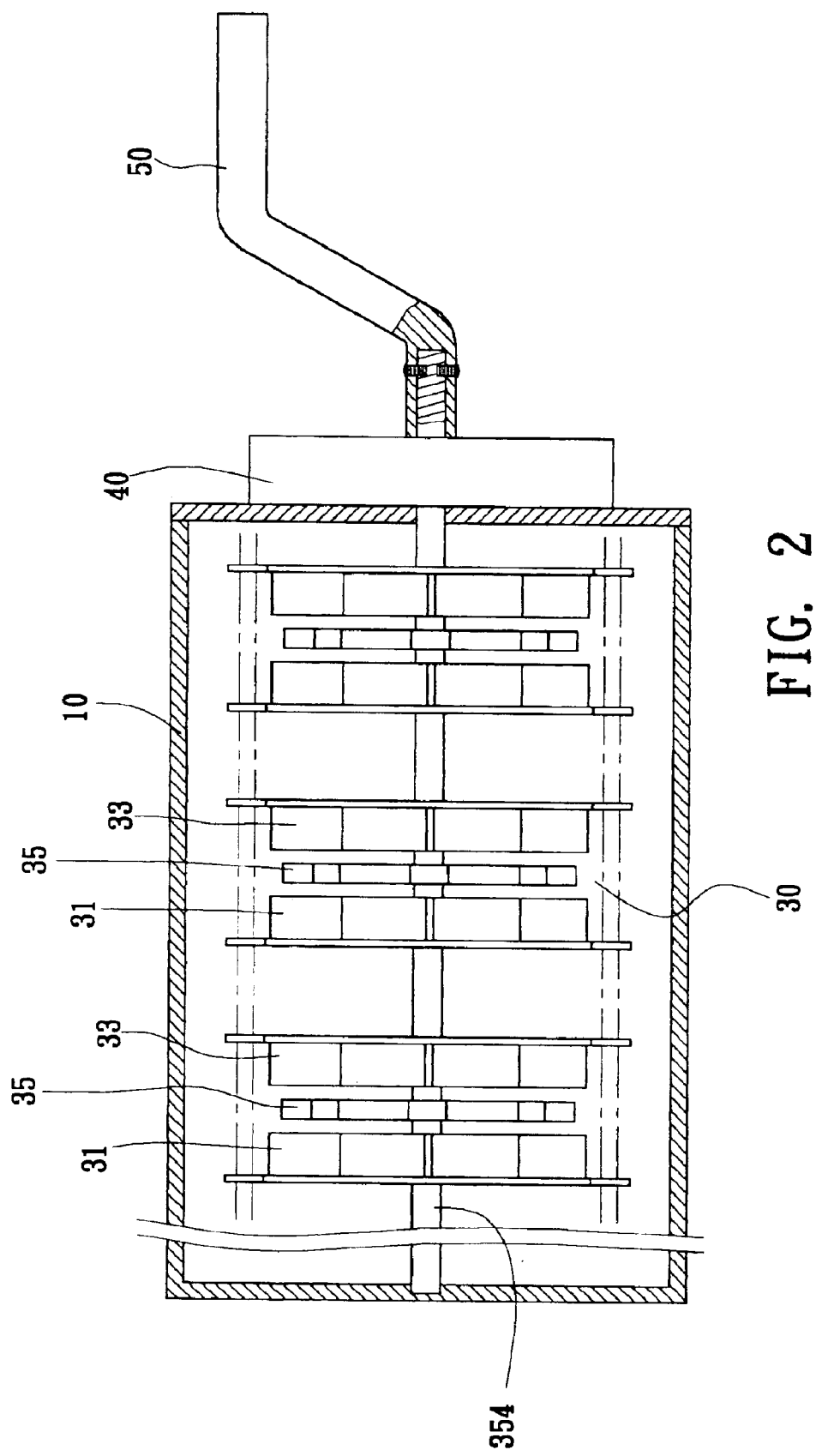
FIG. 2 is a cross-sectional view of the present invention.

Referring to FIG. 2, there is shown a cross-sectional view of the present invention. While assemble the present invention of the electrical power generator 1, at least one sleeve tube 353 is installed on the transmission axis 354, then the first power generation portion 31, the centerboard 35 and the second power generation portion 33 are installed in order to the sleeve tube 353, the first power generation portion 31, the centerboard 35, the second power generation portion 33 are vertical to the sleeve tube 353; the number of the first power generation portion 31, the centerboard 35, the second power generation portion 33 and the sleeve tube 353 can be varied as required. The outer shell 10 wraps around the electrical power generator 1, the gear set 40, the first power generation portion 31 and the second power generation portion 33 are fastened by screws, the starting device 50 is finally installed on the one end of the gear set 40 to finish the installation. The gear set 40 and the starting device 50 can be installed on one end of the first power generation portion 31 or on the second power generation portion 33 depends on the convenience of users. The starting device 50 can be brought up by wind, water power to turn the gear set 40 and the centerboard 35, the first power generation portion 31 and the second power generation portion 33 remain stable for centerboard 35 to move and generate electrical power.

The principle of the present invention is as following: users start the starting device 50 to turn at least one centerboard 35, every permanent magnet 351 of the centerboard 35 generates alternative magnetic field with a plurality first coil set 311 and a plurality second coil set 331 on both sides to generate electrical power output. The distance between every two permanent magnet 351 is very small that makes the magnetic resistance is small, the speed variation effect by the gear set 40 also reduces the strength needed during power generation.

Figure 3:
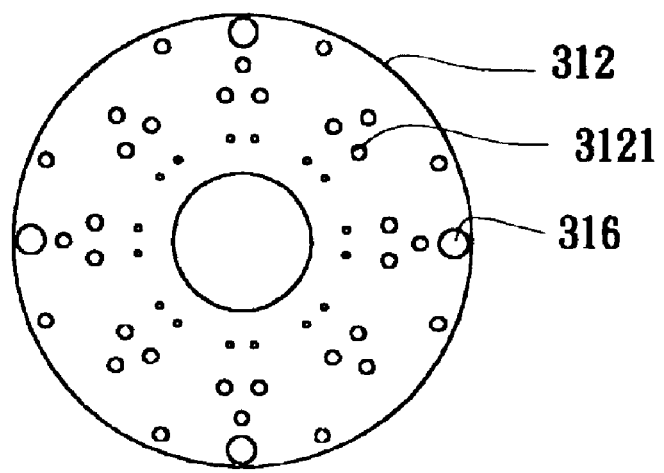
FIG. 3 is a perspective view of the first PCB in accordance with the present invention.

Referring to FIG. 3, there is shown a perspective view of a plurality through hole 3121 on the first PCB 312. For better effect, the PCB 312 should be round with a plurality through hole 3121 (same on the second PCB 332), three through hole 3121 are grouped into a set in triangle shape to combine with the first coil set 311 and the second coil set 331, the through hole 3121 are grouped into a set in triangle shape to stable the first coil set 311 and the second coil set 331.

Figure 4:
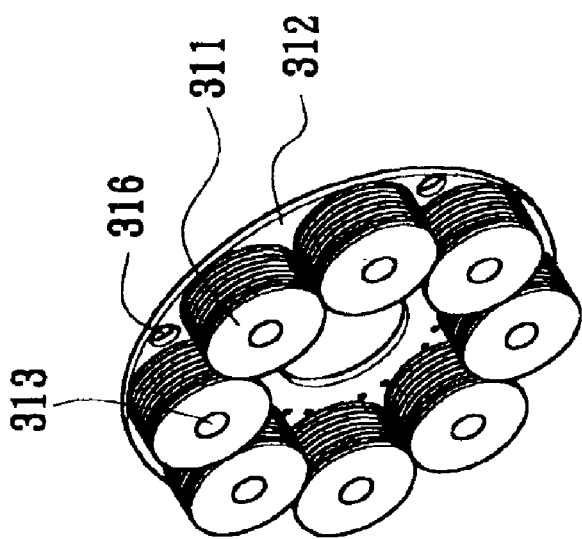
FIG. 4 is an elevation view of an application of the first coil sets on the first PCB in accordance with the present invention.

Referring to FIG. 4, an elevation view of an application, the first coil set 311 are inserted into a plurality through hole 3121 of the first PCB 312 for stability; the placement of the first coil set 311 is to match the location of the permanent magnet 351. The second coil set 331 are inserted into a plurality through hole 3321 of the second PCB 332 for stability.

Figure 5:
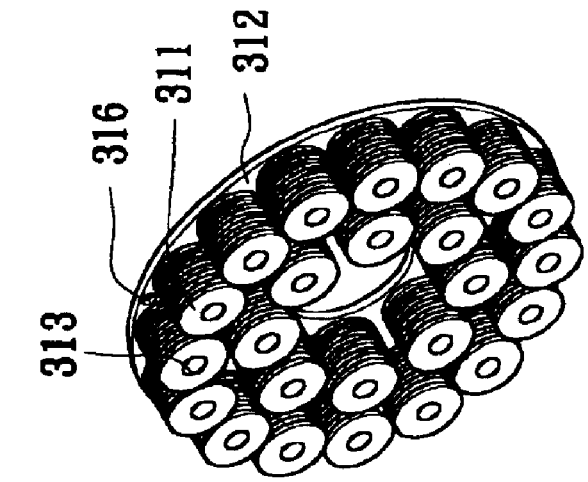
FIG. 5 is an elevation view of another application of the first coil sets on the first PCB in accordance with the present invention.

Referring to FIG. 5, an elevation view of another application, the physical size of the first coil set 311 can be reduced; and the number of the first coil set 311 can be increased, the first coil set 311 are inserted into a plurality through hole 3121 of the first PCB 312 in concentric format for stability, the placement of the first coil set 311 is to match the location of permanent magnet 351. The second coil set 331 are inserted into a plurality through hole 3121 of the second PCB 332 in same format for stability.

Figure 6:
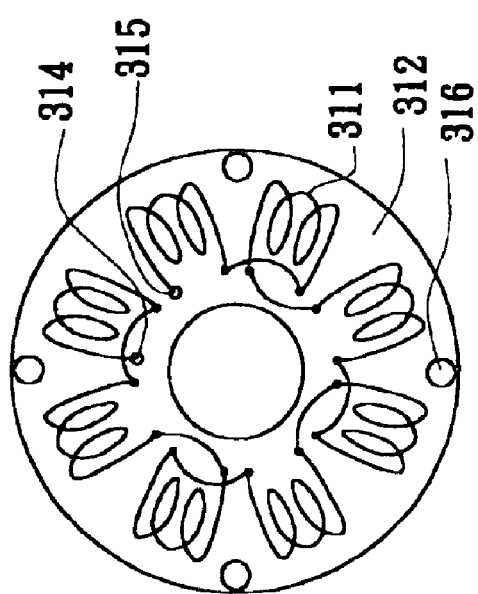
FIG. 6 is a perspective view of the input of a plurality first coil sets and the output of a plurality second coil sets connected in series in accordance with the present invention.

Referring to FIG. 6, a perspective view of the input 314 of a plurality of the first coil set 311 are connected in parallel with the output 335 of the second coil set 331. The output 315 of the first coil set 311 is connected to the input 314 of next first coil set 311 for higher voltage power output. However the input 314 of every first coil set 311 can be connected to the output 315 of the entire first coil set 311 in parallel for higher current power output. The connection relies on different application.

Figure 7:
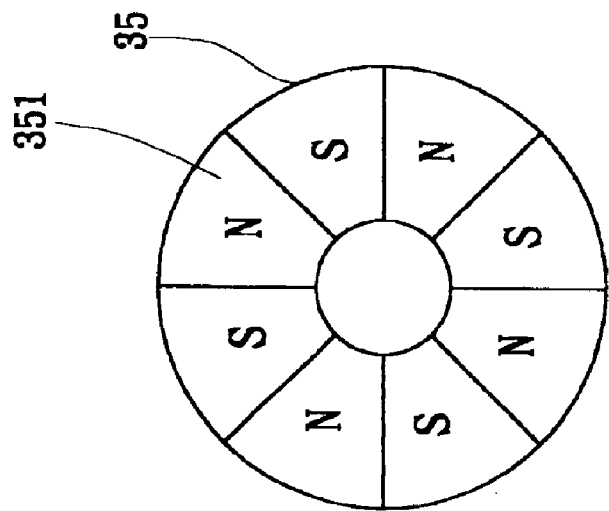
FIG. 7 is a perspective view of the layout placement of the permanent magnetic bodies in accordance with the present invention.

Referring to FIG. 7, there is shown the placement chart of the permanent magnet 351. As shown in FIG, the permanent magnet 351 are placed with plus and minus poles together, a N pole end of a permanent magnet 351 is adjacent to S pole of another permanent magnet 351; the number of permanent magnet 351 must be in even by this arrangement. The gap distance between two permanent magnet 351 is very small to reduce the resistance when the permanent magnet 351 change polarity for less strength. The electrical current flows from N pole to S pole, the first coil set 311 and the second coil set 331 must be connected in series. The shape of the permanent magnet 351 can be in bar, round or other formats; the manufacture method is also not limited. The relation between the permanent magnet 351 of the centerboard 35 and the first coil set 311, the second coil set 331 can be one permanent magnet 351 to one first set coil 311 or one second coil set 331, or two permanent magnet 351 to one first coil set 311 or one second coil set 331.

Users roll the starting device 50 to turn the power generation unit 30 to generate electrical power, the power generation unit 30 can be connected either in series or in parallel depends on different applications to achieve electrical power generation with easy and less strength.

While a preferred embodiment of the invention has been shown and described in details, it will be readily understood and appreciated that numerous omissions, changes and additions may be made without departing from the spirit and scope of the invention.

What is claimed is:

1. An electrical power-generating device comprising: an outer shell, at least one power generation unit, at least one centerboard, a transmission axis a gear set and a starting device; wherein, at least one of said power generation unit and at least one centerboard installed vertically to said transmission axis, said centerboard installed inside said outer shell and having a plurality permanent magnets, a plurality coil sets located on both sides of said power generation unit, when said starting device rolling and turning said centerboards on said transmission axis, the movement generates electrical power when a plurality permanent magnets pass through a plurality coil sets.

2. The electrical power-generating device recited in claim 1, wherein said power generation unit further compromising:
   a first power generation portion consisting of a plurality first coil sets and a first PCB, every said first coil set consists of an input, an output and is wrapped in a first core, said first PCB has a plurality through hole; and
   a second power generation portion consisting of a plurality second coil sets and a second PCB, every said second coil set consists of an input, an output and is wrapped in a second core, said second PCB has a plurality through holes.

3. The electrical power-generating device recited in claim 1, wherein the outer side of said first PCB and said second PCB having at least one screw hole, screws or other fixing devices can pass through those said screw holes to fix said first power generation portion and said second power generation portion respectively.

4. The electrical power-generating device recited in claim 1, wherein said gear set being installed on one end of said outer shell.

5. The electrical power-generating device recited in claim 1, wherein said starting device can be brought up by wind, water or manpower to turn said gear set and said power generation unit for electrical power.

6. The electrical power-generating device recited in claim 1, wherein said centerboard further compromising:
   a third round hole located on the center of said centerboard; and
   a sleeve tube passing through said third round hole, the thicknesses on two ends of said sleeve tube are different.

7. The electrical power-generating device recited in claim 2, wherein three said through hole being grouped into a set in triangle shape.

8. The electrical power-generating device recited in claim 2, wherein said first core and said second core being made of non-conductive material and are in round or elliptical shape, even number in quantity and fixed onto said through holes of said first PCB and said second PCB.

9. The electrical power-generating device recited in claim 2, wherein a plurality said first coil sets and a plurality said second coil sets being inserted into said first PCB and said second PCB in concentric format for stability.

10. The electrical power-generating device recited in claim 1, wherein said centerboard having one said permanent magnet corresponding to one said first set coil.

11. The electrical power-generating device recited in claim 1, wherein said centerboard having two said permanent magnets corresponding to one said first set coil.

* * * * *